US008605462B2

(12) United States Patent
Yang

(10) Patent No.: US 8,605,462 B2
(45) Date of Patent: Dec. 10, 2013

(54) SWITCHING CIRCUIT FOR PRIMARY-SIDE REGULATED RESONANT POWER CONVERTERS

(75) Inventor: Ta-Yung Yang, Milpitas, CA (US)

(73) Assignee: System General Corporation, Sindian, Taipei County (TW)

( * ) Notice: Subject to any disclaimer, the term of this patent is extended or adjusted under 35 U.S.C. 154(b) by 475 days.

(21) Appl. No.: 12/546,801

(22) Filed: Aug. 25, 2009

(65) Prior Publication Data
US 2010/0182804 A1 Jul. 22, 2010

Related U.S. Application Data

(60) Provisional application No. 61/205,358, filed on Jan. 16, 2009.

(51) Int. Cl.
H02M 3/335 (2006.01)
(52) U.S. Cl.
USPC ..................... 363/21.02; 363/21.16

(58) Field of Classification Search
USPC ................ 363/21.08–21.18, 16, 21.02–21.03
See application file for complete search history.

(56) References Cited

U.S. PATENT DOCUMENTS

| 6,018,467 A * | 1/2000 | Majid et al. ...................... 363/16 |
| 6,154,375 A * | 11/2000 | Majid et al. ...................... 363/16 |
| 7,313,004 B1 * | 12/2007 | Yang et al. ................. 363/21.02 |

* cited by examiner

Primary Examiner — Jue Zhang
(74) Attorney, Agent, or Firm — McClure, Qualey & Rodack, LLP

(57) ABSTRACT

The present invention provides a switching circuit to regulate an output voltage and a maximum output current at the primary side of a resonant power converter. The switching circuit includes a pair of switching devices and a controller. The controller is coupled to a transformer to sample a voltage signal thereof and generates switching signals to control the switching devices. The switching frequency of the switching signals is increased in response to the decrease of the output voltage. The increase of the switching frequency of the switching signals decreases the power delivered to the output of the resonant power converter. The output current is therefore regulated.

4 Claims, 7 Drawing Sheets

SWITCHING CIRCUIT FOR PRIMARY-SIDE REGULATED RESONANT POWER CONVERTERS

CROSS REFERENCE TO RELATED APPLICATIONS

The present application claims the benefit of U.S. provisional application entitled "A Control Circuit for Regulating Output Voltage and Output Current in the Primary Side of Resonant Power Converter", Ser. No. 61/205,358, filed Jan. 16, 2009.

BACKGROUND OF THE INVENTION

1. Field of the Invention

The present invention relates generally to power converters, and more particularly, to a switching circuit for a primary-side regulated resonant power converter.

2. Description of the Related Art

Recently, most prior-art technologies are developed on flyback switching topology, such as "Switching Control Circuit for Primary-side Controlled Power Converters" U.S. Pat. No. 7,362,592, and "Primary-side Controlled Switching Regulator" U.S. Pat. No. 7,352,595, etc.

In resonant switching power converters, the inherent soft-switching characteristic thereof is advantageous to reduce the EMI (Electro-Magnetic Interference). However, in conventional arts, a secondary feedback circuit is still required for providing the information of an output voltage of the resonant power converter. The device counts of the secondary feedback circuit dominate the main cost and lower the conversion efficiency of the resonant power converter.

As a result, there is a need to provide a primary-side regulated resonant power converter with lower cost and higher power conversion efficiency.

BRIEF SUMMARY OF THE INVENTION

Embodiments of the present invention are directed to a switching circuit to regulate an output voltage and a maximum output current at the primary side of a resonant power converter. The switching circuit comprises a pair of switching devices and a controller. The controller generates a pair of switching signals to control the switching devices for switching a transformer. A voltage signal of the transformer is sampled to generate a voltage-feedback signal and a current-control signal during an on-time of one of the switching signals. The voltage-feedback signal and the current-control signal control a switching frequency of the switching signals.

The controller comprises a sampling circuit, an equalization circuit, and an oscillator. The sampling circuit is coupled to the transformer for producing the voltage-feedback signal by sampling the voltage signal from an auxiliary winding of the transformer. The equalization circuit is coupled to the sampling circuit for generating the current-control signal in response to the voltage-feedback signal. The oscillator generates an oscillation signal. The oscillation signal is generated in response to the voltage-feedback signal and the current-control signal to determine the switching frequency of the switching signals.

The sampling circuit comprises a delay circuit generating a sampling signal after a delay time in response to the enabling of said one of the switching signals to sample the voltage signal. The delay time is further correlated to the switching frequency of the switching signals.

It is an objective of the present invention to reduce electromagnetic interference of the resonant power converter.

It is also another objective of the present invention to reduce the cost of the resonant power converter.

It is still another objective of the present invention to achieve higher power conversion efficiency of the resonant power converter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
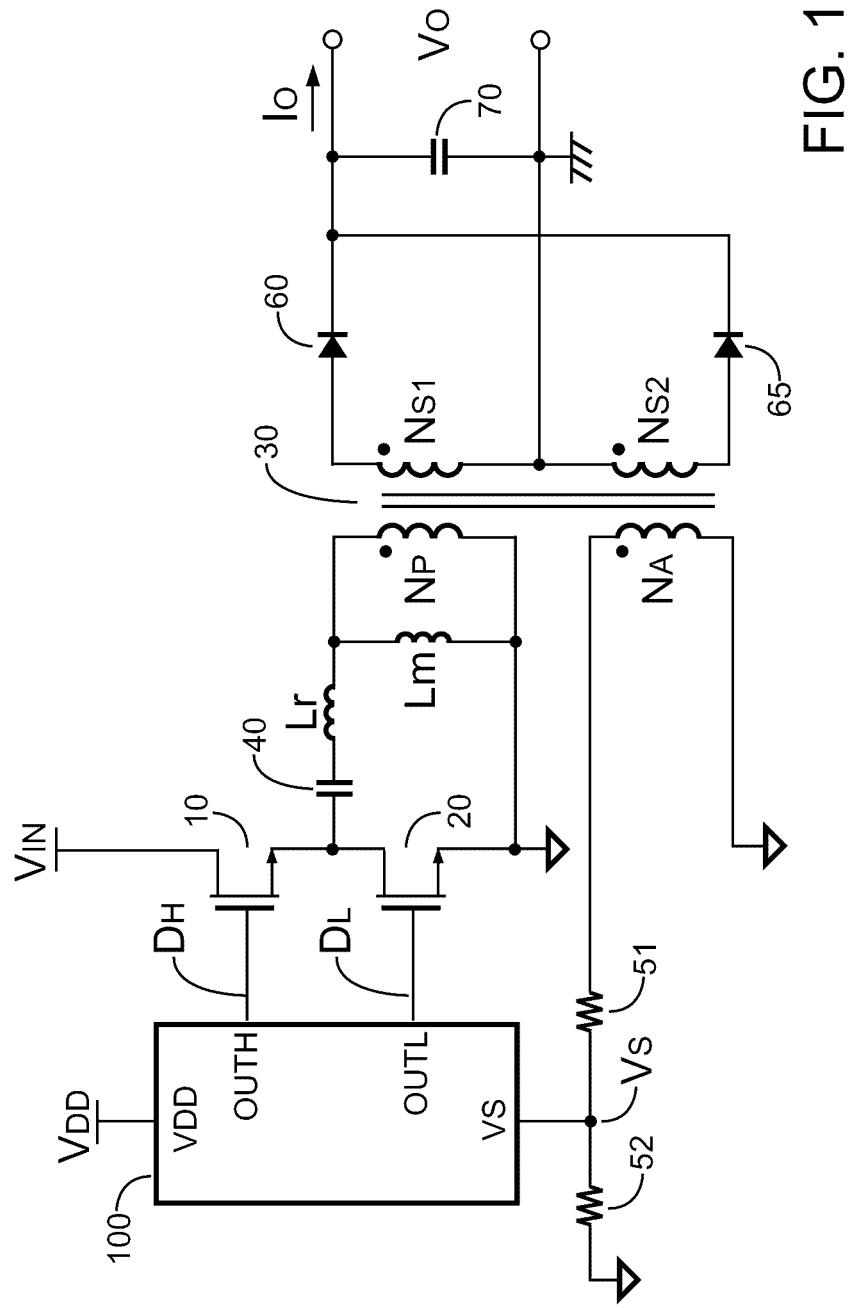
FIG. 1 schematically shows a primary-side-regulated resonant power converter according to the present invention.

FIG. 1 shows a resonant power converter. The resonant power converter comprises a switching circuit, resistors 51 and 52, rectifiers 60 and 65, capacitors 40 and 70, and a transformer 30 having a primary winding $N_P$, an auxiliary winding $N_A$, a first secondary winding $N_{S1}$, and a second secondary winding $N_{S2}$. The switching circuit includes a controller 100 and a pair of switching devices 10 and 20. The switching devices 10 and 20 are, in an embodiment of the present invention, transistors which are connected in series between an input voltage $V_{IN}$ and a ground reference. The controller 100 has a pair of driving terminals OUTH and OUTL to generate switching signals $D_H$ and $D_L$ to control the switching devices 10 and 20, respectively. The capacitor 40, an inductor Lr, and the primary winding $N_P$ of the transformer 30 are connected in series between the ground reference and a joint of the switching devices 10 and 20. Another inductor Lm is connected with the primary winding $N_P$ of the transformer 30 in parallel. The resistors 51 and 52 are connected in series to form a voltage divider. The voltage divider is connected with the auxiliary winding $N_A$ of the transformer 30 in parallel. A voltage signal $V_S$ is obtained at a joint of the resistors 51 and 52 which is connected to a sense terminal VS of the controller 100. The voltage signal $V_S$ is an attenuated voltage of a voltage across the auxiliary winding $N_A$ of the transformer 30. Further, the voltage signal $V_S$ is correlated to an output voltage $V_O$ of the resonant power converter. A first terminal of the first secondary winding $N_{S1}$ is connected to an anode of the rectifier 60. A second terminal of the first secondary winding $N_{S1}$ is connected to a first terminal of the second secondary winding $N_{S2}$. A second terminal of the second secondary winding $N_{S2}$ is connected to an anode of the rectifier 65. The capacitor 70 is connected between a cathode of the rectifier 60 and the second terminal of the first secondary winding $N_{S1}$ for generating the output voltage $V_O$. A cathode of the rectifier 65 is connected to the cathode of the rectifier 60. The controller 100 controls the switching devices 10 and 20 to switch the transformer 30 for regulating the output voltage $V_O$ and a maximum of an output current $I_O$ of the resonant power converter. The inductors $L_r$ and $L_m$ are coupled to the capacitor 40 for developing a resonant tank.

Figure 2:
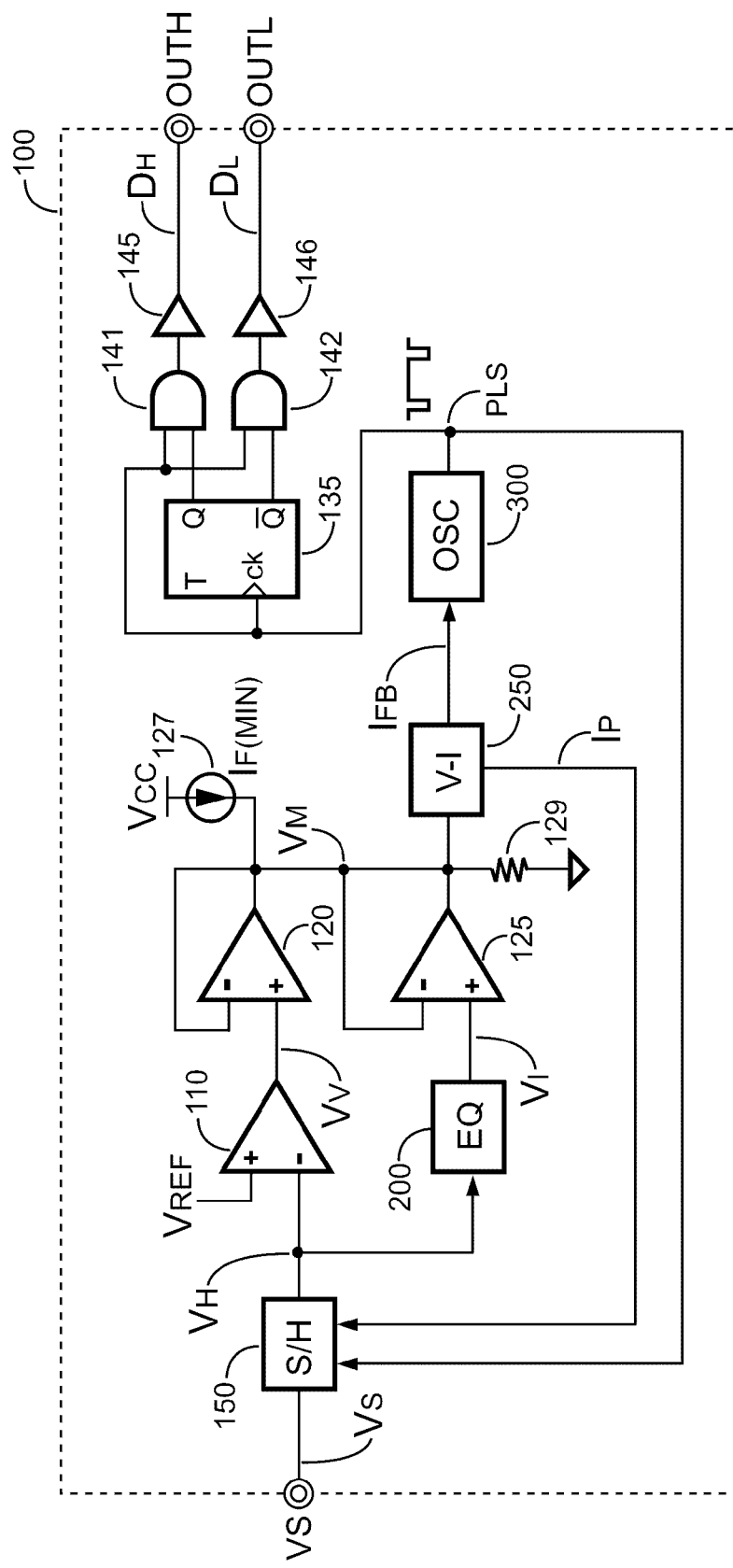
FIG. 2 shows an embodiment of a controller of the resonant power converter according to the present invention.

FIG. 2 shows an embodiment of the controller 100 according to the present invention. The controller 100 comprises a sampling circuit (S/H) 150, an equalization circuit (EQ) 200, an error amplifier 110, a buffer circuit, a voltage-to-current converter (V-I) 250, an oscillator (OSC) 300, and a driving circuit. The sampling circuit 150 is coupled to the auxiliary winding $N_A$ of the transformer 30 to sample the voltage signal $V_S$ to generate a voltage-feedback signal $V_H$ during an on-time of the switching signal $D_H$. The error amplifier 110 amplifies the difference of the voltage-feedback signal $V_H$ and a reference signal $V_{REF}$ to generate an amplified signal $V_V$, which forms a voltage feedback loop for output voltage regulation. The equalization circuit 200 is coupled to the sampling circuit 150 for generating a current-control signal $V_I$ in response to the voltage-feedback signal $V_H$. Since the voltage signal $V_S$ is correlated to the output voltage $V_O$, the voltage-feedback signal $V_H$ will also be correlated to the output voltage $V_O$ of the power converter. The current-control signal $V_I$ is therefore in proportion to the output voltage $V_O$. The buffer circuit comprises an operational amplifier 120, an operational amplifier 125, a resistor 129, and a current source 127. A positive terminal of the operational amplifier 120 receives the amplified signal $V_V$. A negative terminal of the operational amplifier 120 is connected to an output terminal thereof. The current source 127 is connected between a supply voltage $V_{CC}$ and the output terminal of the operational amplifier 120. A positive terminal of the operational amplifier 125 receives the current-control signal $V_I$. A negative terminal of the operational amplifier 125 is connected to an output terminal thereof and the output terminal of the operational amplifier 120. The outputs of the operational amplifiers 120 and 125 are open-drain type. The resistor 129 is connected between the output terminal of the operational amplifier 125 and the ground reference. The buffer circuit receives the amplified signal $V_V$ and the current-control signal $V_I$ to generate a frequency-control signal $V_M$. The current source 127 associates with the resistor 129 for determining the maximum magnitude of the frequency-control signal $V_M$, which determines the minimum switching frequency of the switching signals $D_H$ and $D_L$. The voltage-to-current converter 250 receives the frequency-control signal $V_M$ to generate a frequency-control current $I_{FB}$ and a current signal $I_P$. The oscillator 300 receives the frequency-control current $I_{FB}$ to generate an oscillation signal PLS. The oscillation signal PLS and the current signal $I_P$ are further provided to the sampling circuit 150. The driving circuit comprises a flip-flop 135, AND gates 141 and 142, and buffers 145 and 146. The oscillation signal PLS is supplied to a clock-input of the flip-flop 135, a first input of the AND gate 141, and a first input of the AND gate 142. An output of the flip-flop 135 is connected to a second input of the AND gate 141. An inverse output of the flip-flop 135 is connected to a second input of the AND gate 142. An output of the AND gate 141 generates the switching signal $D_H$ via the buffer 145. An output of the AND gate 142 generates the switching signal $D_L$ via the buffer 146. The current-control signal $V_I$ generated by the equalization circuit 200 is used to limit the maximum magnitude of the frequency-control signal $V_M$ via the operational amplifier 125. The frequency-control signal $V_M$ is generated in response to the voltage-feedback signal $V_H$ and the current-control signal $V_I$ for controlling the switching frequency of the switching signals $D_H$ and $D_L$.

Figure 3:
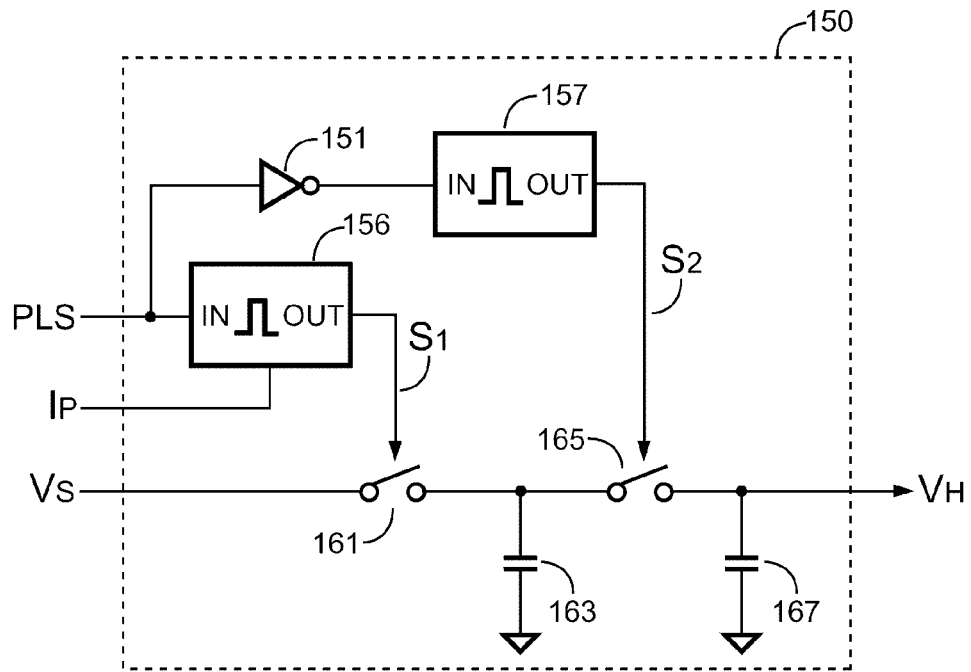
FIG. 3 shows an embodiment of a sampling circuit of the controller according to the present invention.

FIG. 3 shows an embodiment of the sampling circuit 150 according to the present invention. The sampling circuit 150 comprises a first delay circuit 156, a second delay circuit 157, an inverter 151, switches 161 and 165, and capacitors 163 and 167. The first delay circuit 156 receives the oscillation signal PLS and the current signal $I_P$ to generate a first sampling signal $S_1$. An input of the inverter 151 receives the oscillation signal PLS. An output of the inverter 151 is connected to an input of the second delay circuit 157. An output of the second delay circuit 157 generates a second sampling signal $S_2$. A first terminal of the switch 161 receives the voltage signal $V_S$. A second terminal of the switch 161 is connected to a first terminal of the switch 165. The capacitor 163 is connected between the second terminal of the switch 161 and the ground reference. The capacitor 167 is connected between a second terminal of the switch 165 and the ground reference. The switch 161 is controlled by the first sampling signal $S_1$. The switch 165 is controlled by the second sampling signal $S_2$. At the instance that the oscillation signal PLS rises from logic low to logic high, the first sampling signal $S_1$ will be generated to turn on the switch 161 after a first delay time in response to the enabling of the switching signal $D_H$. The voltage signal $V_S$ will be held across the capacitor 163 as the switch 161 is turned on. At the instance that the oscillation signal PLS drops from logic high to logic low, the second delay circuit 157 will generate the second sampling signal $S_2$ after a second delay time. The voltage-feedback signal $V_H$ is generated across the capacitor 167 once the switch 165 is turned on by the second sampling signal $S_2$.

Figure 4A:
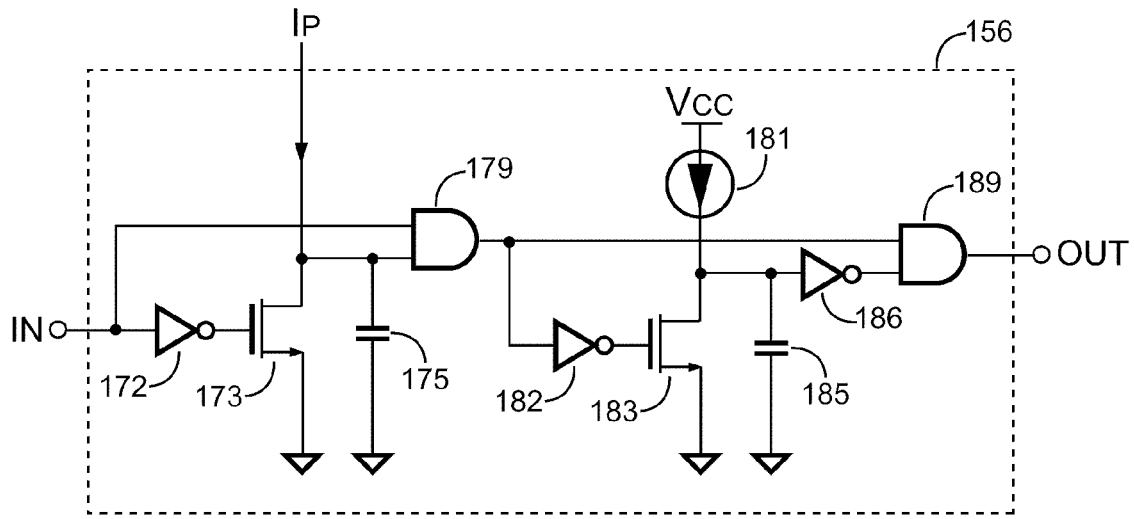
FIG. 4A shows an embodiment of a first delay circuit of the sampling circuit according to the present invention.

FIG. 4A shows an embodiment of the first delay circuit 156 of the sampling circuit 150 according to the present invention. The first delay circuit 156 comprises inverters 172, 182, and 186, transistors 173 and 183, capacitors 175 and 185, AND gates 179 and 189, and a current source 181. An input IN of the first delay circuit 156 is connected to an input of the inverter 172 and a first input of the AND gate 179. An output of the inverter 172 is connected to a gate of the transistor 173. A drain of the transistor 173 is connected to a second input of the AND gate 179. A source of the transistor 173 is connected to the ground reference. The capacitor 175 is connected between the drain of the transistor 173 and the ground reference. The current signal $I_P$ is supplied to the drain of the transistor 173. An output of the AND gate 179 is connected to a first input of the AND gate 189 and an input of the inverter 182. An output of the inverter 182 is connected to a gate of the transistor 183. A drain of the transistor 183 is connected to an input of the inverter 186. A source of the transistor 183 is connected to the ground reference. The capacitor 185 is connected between the drain of the transistor 183 and the ground reference. The current source 181 is connected between the supply voltage $V_{CC}$ and the drain of the transistor 183. An output of the inverter 186 is connected to a second input of the AND gate 189. An output of the AND gate 189 is connected to an output OUT of the first delay circuit 156. The first delay time is determined by the current magnitude of the current signal $I_P$ and the capacitance of the capacitor 175, that is, the first delay time is variable and correlated to the current signal $I_P$. Since the current signal $I_P$ is correlated to the switching frequency of the switching signals $D_H$ and $D_L$ (the correlation between the current signal $I_P$ and the switching frequency of the switching signals $D_H$ and $D_L$ will be shown in the following description of FIG. 6), the first delay time is therefore correlated to the switching frequency of the switching signals $D_H$ and $D_L$.

Figure 4B:
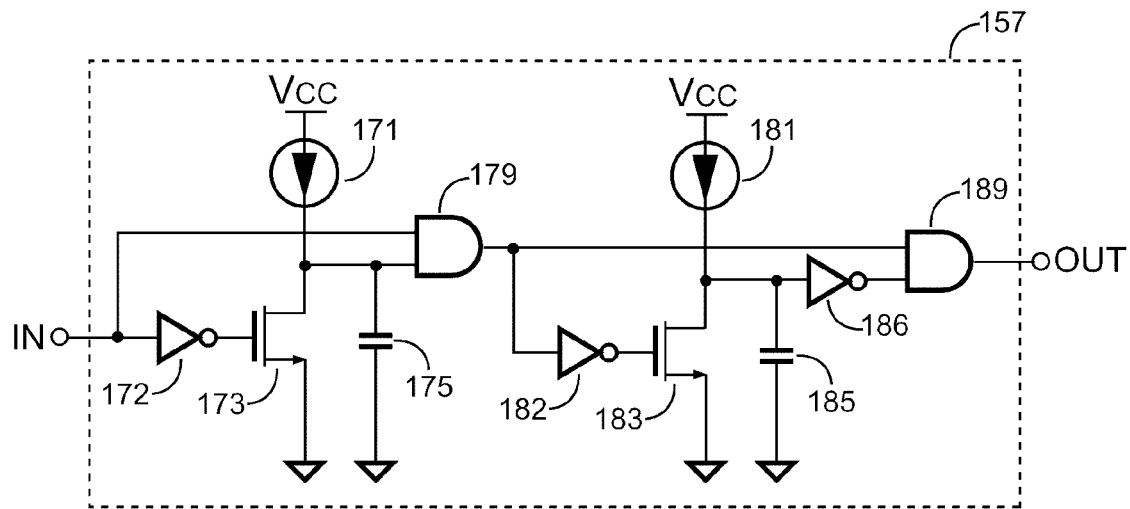
FIG. 4B shows an embodiment of a second delay circuit of the sampling circuit according to the present invention.

FIG. 4B shows an embodiment of the second delay circuit 157 of the sampling circuit 150 according to the present invention. The only embodiment difference of the second delay circuit 157 from the first delay circuit 156 is that the capacitor 175 of the second delay circuit 157 is charged by a current source 171 instead of the current signal $I_P$. The second delay time is a constant which is determined by the current magnitude of the current source 171 and the capacitance of the capacitor 175.

Figure 5:
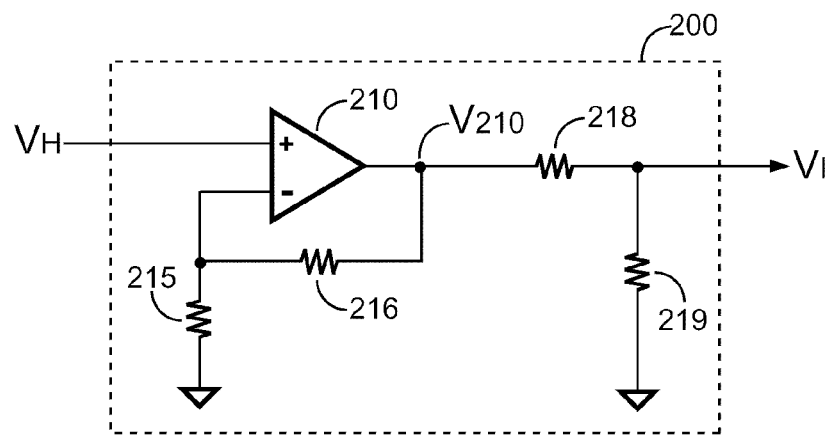
FIG. 5 shows an embodiment of an equalization circuit of the controller according to the present invention.

FIG. 5 shows an embodiment of the equalization circuit 200 according to the present invention. The equalization circuit 200 comprises an operational amplifier 210, and resistors 215, 216, 218, and 219. A positive terminal of the operational amplifier 210 is supplied with the voltage-feedback signal $V_H$. The resistor 215 is connected between a negative terminal of the operational amplifier 210 and the ground reference. The resistor 216 is connected between the negative terminal of the operational amplifier 210 and an output terminal thereof. The resistors 218 and 219 are connected in series between the output terminal of the operational amplifier 210 and the ground reference. The current-control signal $V_I$ is obtained at a joint of the resistors 218 and 219.

An output voltage $V_{210}$ at the output terminal of the operational amplifier 210 and the current-control signal $V_I$ can be expressed as following equations:

$$V_{210} = V_H \times \left(1 + \frac{R_{216}}{R_{215}}\right) \quad (1)$$

$$V_I = V_{210} \times \left(\frac{R_{219}}{R_{218}+R_{219}}\right) = V_H \times \left[\left(1 + \frac{R_{216}}{R_{215}}\right) \times \left(\frac{R_{219}}{R_{218}+R_{219}}\right)\right] \quad (2)$$

As equation (2) shows, the current-control signal $V_I$ is in proportional to the voltage-feedback signal $V_H$. Further, the current-control signal $V_I$ is in proportion to the output voltage $V_O$ of the power converter due to the correlation between the voltage-feedback signal $V_H$ and the output voltage $V_O$, as above described.

Figure 6:
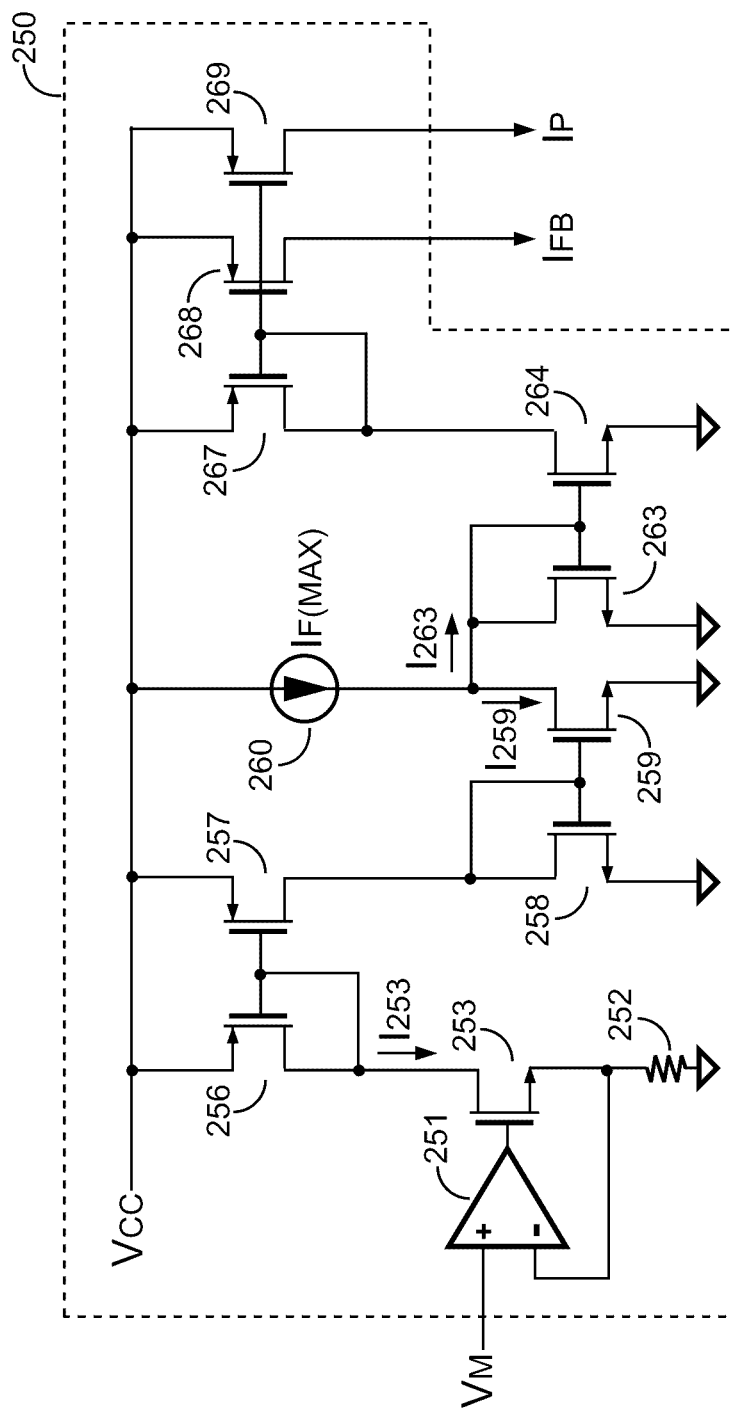
FIG. 6 shows an embodiment of a voltage-to-current converter of the controller according to the present invention.

FIG. 6 shows an embodiment of the voltage-to-current converter 250 of the controller 100 according to the present invention. The voltage-to-current converter 250 comprises a voltage-to-current circuit, a first mirror circuit, a second mirror circuit, and a current source 260. The voltage-to-current circuit comprises an operational amplifier 251, a transistor 253, and a resistor 252. The frequency-control signal $V_M$ is supplied to a positive terminal of the operational amplifier 251. A negative terminal of the operational amplifier 251 is connected to a source of the transistor 253. The resistor 252 is connected between the source of the transistor 253 and the ground reference. An output terminal of the operational amplifier 251 is connected to a gate of the transistor 253. A transistor 256, a transistor 257, a transistor 258 and a transistor 259 form the first mirror circuit. A transistor 263, a transistor 264, a transistor 267, a transistor 268, and a transistor 269 form the second mirror circuit. An input of the first mirror circuit is a drain of the transistor 256. The input of the first mirror circuit is connected to the transistor 253 to receive a current $I_{253}$ flowing through the transistor 253. A drain of the transistor 259 is an output of the first mirror circuit. The output of the first mirror circuit is connected to an input of the second mirror circuit which is a drain of the transistor 263. A first output of the second mirror circuit generates the frequency-control current $I_{FB}$ at a drain of the transistor 268. A second output of the second mirror circuit generates the current signal $I_P$ at a drain of the transistor 269. The current source 260 is connected between the supply voltage $V_{CC}$ and the output of the first mirror circuit. The first mirror circuit generates a current $I_{259}$ at the drain of the transistor 259 in response to the frequency-control signal $V_M$. Since the frequency-control signal $V_M$ is limited by the current-control signal $V_I$, the current $I_{259}$ is therefore limited by the current-control signal $V_I$. A current $I_{F(MAX)}$ of the current source 260 can be expressed by the following equation:

$$I_{F(MAX)} = I_{259} + I_{263} \quad (3)$$

Where $I_{263}$ is a current supplied to the input of the second mirror circuit. The frequency-control current $I_{FB}$ and the current signal $I_P$ are generated in response to the current $I_{263}$. Since the current $I_{F(MAX)}$ is a constant, referring to equation (2), the frequency-control current $I_{FB}$ and the current signal $I_P$ will be in inverse proportion to the frequency-control signal $V_M$. The current $I_{F(MAX)}$ therefore limits the maximum of the frequency-control current $I_{FB}$. Further, the current $I_{F(MAX)}$ also determines the maximum switching frequency of the switching signals $D_H$ and $D_L$.

Moreover, as above described, the current source 127 in FIG. 2 associates with the resistor 129 for determining a maximum magnitude of the frequency-control signal $V_M$. Since the frequency-control current $I_{FB}$ and the current signal $I_P$ are in inverse proportion to the frequency-control signal $V_M$, the minimum of the frequency-control current $I_{FB}$ is determined accordingly. Thus, the minimum switching frequency of the switching signals $D_H$ and $D_L$ is determined according to the minimum of the frequency-control current $I_{FB}$. In other words, the current source 127 and the resistor 129 determine the minimum switching frequency of the switching signals $D_H$ and $D_L$.

Figure 7:
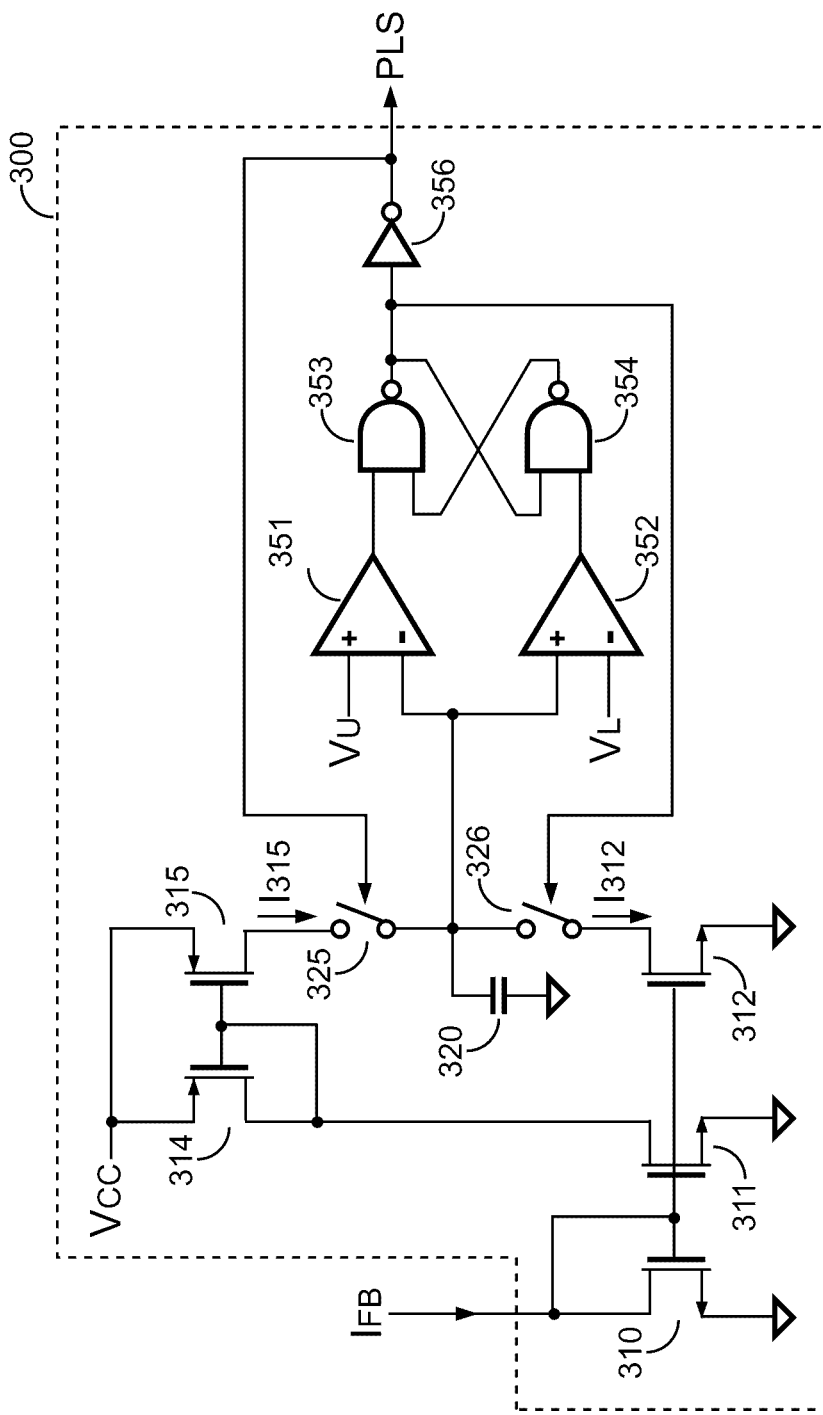
FIG. 7 shows an embodiment of an oscillator of the controller according to the present invention.

FIG. 7 shows an embodiment of the oscillator 300 of the controller 100 according to the present invention. The oscillator 300 comprises a third mirror circuit, a capacitor 320, switches 325 and 326, and a period circuit. The third mirror circuit is formed by a transistor 310, a transistor 311, a transistor 312, a transistor 314, and a transistor 315. The frequency-control current $I_{FB}$ is supplied to an input of the third mirror circuit which is a drain of the transistor 310. A first output of the third mirror circuit is a drain of the transistor 315. The first output of the third mirror circuit supplies a charge current $I_{315}$ to a first terminal of the switch 325 for charging the capacitor 320 when the switch 325 is turned on. A second terminal of the switch 325 is connected to a first terminal of the switch 326. The capacitor 320 is connected to a joint of the switches 325 and 326. A second output of the third mirror circuit is a drain of the transistor 312. The second output of the third mirror circuit is connected to a second terminal of the switch 326 for discharging the capacitor 320 when the switch 326 is turned on to generate a discharging current $I_{312}$. The period circuit comprises comparators 351 and 352, NAND gates 353 and 354, and an inverter 356. A negative terminal of the comparator 351 and a positive terminal of the comparator 352 are connected to the joint of the switches 325 and 326. A positive terminal of the comparator 351 is supplied with an upper threshold $V_U$. A negative terminal of the comparator 352 is supplied with a lower threshold $V_L$. An output terminal of the comparator 351 is connected to a first input of the NAND gate 353. An output terminal of the comparator 352 is connected to a first input of the NAND gate 354. An output of the NAND gate 353 is connected to a second input of the NAND gate 354 and an input of the inverter 356. The output of the NAND gate 353 is also connected to a control terminal of the switch 326. An output of the NAND gate 354 is connected to a second input of the NAND gate 353. An output of the inverter 356 generates the oscillation signal PLS and is connected to a control terminal of the switch 325. The oscillator 300 is used for generating the oscillation signal PLS for determining the switching frequency of the switching signals $D_H$ and $D_L$. The oscillator 300 generates the oscillation signal PLS in response to the frequency-control current $I_{FB}$. Since the frequency-control current $I_{FB}$ is generated in response to the voltage-feedback signal $V_H$ and the current-control signal $V_I$, the oscillation signal PLS will be generated in response to the voltage-feedback signal $V_H$ and the current-control signal $V_I$.

Figure 8:
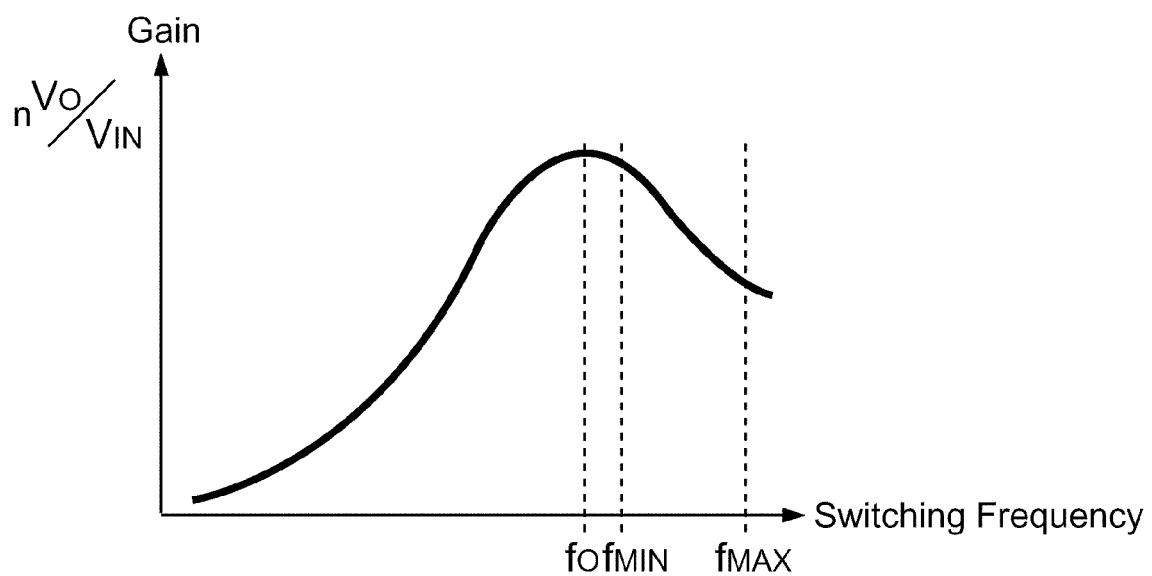
FIG. 8 illustrates the relationship between the switching frequency of the switching signals and the gain of the resonant power converter according to the present invention.

FIG. 8 illustrates the relationship between the switching frequency of the switching signals $D_H$ and $D_L$ and the gain of the resonant power converter according to the present invention. As depicted by FIG. 8, a maximum power is delivered to the secondary windings $N_{S1}$ and $N_{S2}$ of the transformer 30 when the switching signals $D_H$ and $D_L$ is switched at the resonant frequency $f_0$ of the resonant tank. The resonant frequency $f_0$ can be shown as following equation:

$$f_0 = \frac{1}{2\pi\sqrt{L_T \times C_{40}}} \quad (4)$$

where $L_T$ is the equivalent inductance of inductors Lr and Lm; $C_{40}$ is the capacitance of the capacitor 40.

In FIG. 8, the frequency $f_{MIN}$ is the minimum switching frequency of the switching signals $D_H$ and $D_L$. The frequency $f_{MIN}$ is determined by a current $I_{F(MIN)}$ of the current source 127. The frequency $f_{MAX}$ is the maximum switching frequency of the switching signals $D_H$ and $D_L$. The frequency $f_{MAX}$ is determined by the current $I_{F(MAX)}$ of the current source 260.

As FIG. 8 shows, in the interval from the frequency $f_{MIN}$ to the frequency $f_{MAX}$, the switching frequency of the switching signals $D_H$ and $D_L$ is increased in response to the decrease of the output voltage $V_O$. The increase of the switching frequency of the switching signals $D_H$ and $D_L$ will decrease the power delivered to the output of the resonant power converter. The output current $I_O$ is therefore regulated.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching circuit for a resonant power converter, comprising:
   a first switching device coupled between an input voltage and a joint;
   a second switching device coupled between said joint and a ground reference;
   a transformer having a primary winding and an auxiliary winding, wherein said primary winding is coupled to said joint, and said first switching device and said second switching device are controlled respectively by a first switching signal and a second switching for switching said transformer; and
   a controller, coupled to said transformer and generating said first and second switching signals to control said first and second switching devices, wherein said first and second switching signals regulate an output voltage and a maximum output current of said resonant power converter;
   wherein a voltage signal from said auxiliary winding of said transformer is sampled to generate a voltage-feedback signal and a current-control signal during an on-time of said first switching signal; and
   wherein said voltage-feedback signal and said current-control signal control a switching frequency of said switching signals;
   wherein said controller comprises:
   a sampling circuit, coupled to said transformer for producing said voltage-feedback signal by sampling said voltage signal from the auxiliary winding of said transformer; and
   wherein said sampling circuit comprises a delay circuit generating a sampling signal after a delay time in response to enabling of said first switching signal to sample said voltage signal of said transformer; wherein said delay time is correlated to said switching frequency of said first and second switching signals.

2. The switching circuit as claimed in claim 1, wherein said controller further comprises:
   an equalization circuit, coupled to said sampling circuit for generating said current-control signal in response to said voltage-feedback signal; and
   an oscillator, generating an oscillation signal to determine said switching frequency of said first and second switching signals, wherein said oscillation signal is generated in response to said voltage-feedback signal and said current-control signal.

3. A switching circuit for a resonant power converter, comprising:
   a first switching device coupled between an input voltage and a joint;
   a second switching device coupled between said joint and a ground reference;
   a transformer having a primary winding and an auxiliary winding, wherein said primary winding is coupled to said joint, and said first switching device and said second switching device are controlled respectively by a first switching signal and a second switching to switch the transformer for regulating an output voltage of said resonant power converter; and
   a controller, coupled to said transformer and generating said first and second switching signals to control said first and second switching devices, wherein a voltage-feedback signal is generated by sampling a voltage signal from the auxiliary winding of said transformer during an on-time of said first switching signals, and wherein said voltage-feedback signal is further coupled to an error amplifier for generating a frequency-control signal to determine a switching frequency of said first and second switching signals;
   wherein said controller comprises:
   a sampling circuit, coupled to said transformer for producing said voltage-feedback signal by sampling said voltage signal from the auxiliary winding of said transformer;
   wherein said sampling circuit comprises a delay circuit generating a sampling signal after a delay time in response to the enabling of said first switching signal to sample said voltage signal of said transformer, wherein said delay time is correlated to said switching frequency of said first and second switching signals.

4. The switching circuit as claimed in claim 3, wherein said controller further comprises:
an oscillator, for generating an oscillation signal in response to said frequency-control signal, wherein said oscillation signal determines said switching frequency of said first and second switching signals.

* * * * *